H. B. GILLETTE.
PNEUMATIC TIRE.
APPLICATION FILED MAY 8, 1914.
1,141,538.
Patented June 1, 1915.
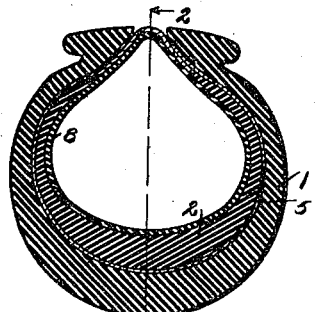
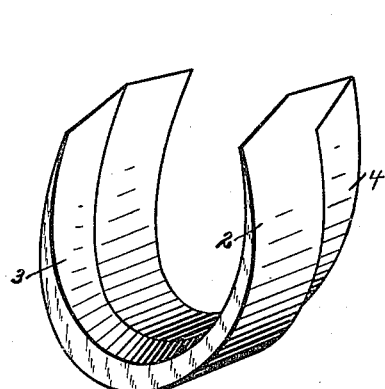
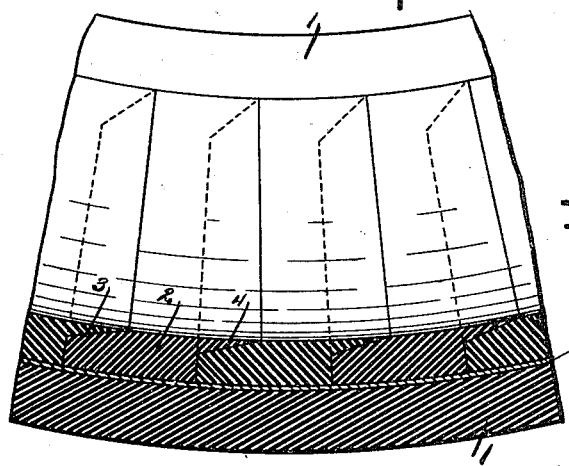
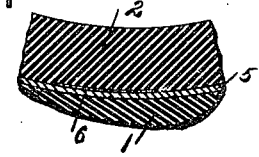
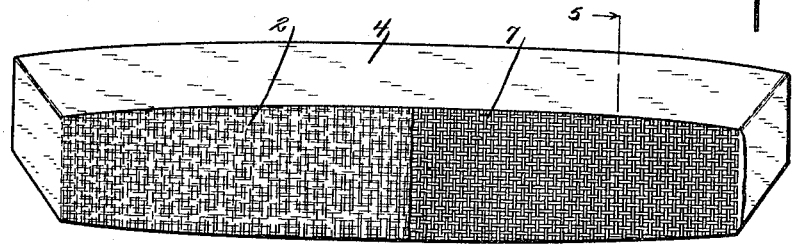
Witnesses
L. G. Greenfield
O. R. DesJardins
Inventor
Herbert B. Gillette
By Chappell & Earl
Attorneys

UNITED STATES PATENT OFFICE.

HERBERT B. GILLETTE, OF GRAND RAPIDS, MICHIGAN.

PNEUMATIC TIRE.

1,141,538.     Specification of Letters Patent.     Patented June 1, 1915.

Application filed May 8, 1914. Serial No. 837,112.

*To all whom it may concern:*

Be it known that I, HERBERT B. GILLETTE, a citizen of the United States, residing at Grand Rapids, in the county of Kent, State of Michigan, have invented certain new and useful Improvements in Pneumatic Tires, of which the following is a specification.

This invention relates to improvements in pneumatic tires.

The object of this invention is to provide in a pneumatic tire an effective protective structure in which segmental jointed soft rubber protectors are secured in place around the periphery of the tire.

Further objects, and objects relating to details and economies of construction and operation will definitely appear from the detailed description to follow.

I accomplish the objects of my invention by the devices and means described in the following specification.

The invention is clearly defined and pointed out in the claims.

A structure constituting a preferred embodiment of my invention is clearly illustrated in the accompanying drawing forming a part of this specification, in which:

Figure I is a transverse sectional view showing a pneumatic tire embodying my invention. Fig. II is an enlarged detail sectional view showing a portion of a tire embodying my invention taken on a line corresponding to line 2—2 of Fig. I. Fig. III is a detail perspective view of one of the protector segments of my improved tire structure, showing said protector segment in the position to which it is flexed when in place in a tire. Fig. IV is a detail plan view of one of the protective segments when molded in the flat, a portion of the rubber being cut away at one side to show the armor fabric therein. Fig. V is an enlarged detail sectional view taken on a line corresponding to line 5—5 of Fig. IV, showing the general formation of the protector segment in cross section. Fig. VI is an enlarged detail fragmentary view, showing the means for securing the protector segments in place in the casing.

In the drawing, the sectional views are taken looking in the direction of the little arrows at the ends of the section lines, and similar numerals of reference refer to similar parts throughout the several views.

Considering the numbered parts of the drawing, I have shown my invention embodied in an ordinary pneumatic automobile tire. The outer casing 1 is of any desired form and the inner tube 8 is of any usual or desired construction. I have not shown the parts in place on the rim as that is not necessary for an understanding of my invention.

My improved protector segments 2 are interposed between the casing and the inner tube and are thicker at the central portion which is toward the periphery of the tire, as clearly appears in Figs. I and III. The segments are provided with joint tongues or flaps 4 projecting from one edge on their inner sides which are beveled to a thin knife edge as appears in cross section in Fig. V. The opposite inner side of each segment is correspondingly beveled as at 3 to receive the joint tongue or flap 4 of the next adjacent segment. These protector segments are secured in place with their thickest portions adjacent the periphery of the tire by applying a thin line of cement 6 to the lining fabric 5 of the outer casing so as to cause the central portion of the protector segment to adhere to the outer casing. This is clearly shown in Fig. VI.

Into each of the soft rubber segments 2, I incorporate a coarse woven armor fabric 7 technically known in the tire art as a breaker strip which retains the rubber effectively in place, prevents its pressing out at each side, insures the proper resistance to any object that may have punctured the outer casing and insures a broad resistance of the soft rubber when a pointed object comes to enter the protector. This is what turns the point of a nail or other pointed object and prevents its puncturing the inner tube. The protector segments are normally flat and are flexed to the position shown in Fig. III when inserted in place within the outer casing of the tire. The segments have a tendency to spring back to their normal flat position and this causes the ends thereof to exert a pressure against the wall of the casing which aids in holding the segments in place.

The protector segments described in the present application are substantially identical with those described in my co-pending application, Serial No. 805,177, filed December 6, 1913, in which application the broad claims to my invention are embodied. In the present form of my invention, however, I have omitted the notches in the protector segment and the retaining ribs on the outer casing and secure the protector segments in place by applying a thin line of cement to the outer casing and thus cementing the centers of the protector segments in place.

I have shown my improved tire structure in the form preferred by me, which I desire to claim specifically. I am aware, however, that the claims can be specifically modified without departing from the spirit of my invention, and, therefore, I desire to claim the same specifically as well as broadly as indicated by my appended claims.

Having thus described my invention, what I claim as new and desire to secure by Letters Patent, is:

1. In a pneumatic tire structure, the combination of an outer casing, an inner tube, protector segments of soft rubber thick in the center and extending to thin edges at each side, said segments being provided with beveled joint flaps on one edge at their inner sides and with beveled portions corresponding to said flaps at the opposite edges, said segments being cemented to the inner wall of said outer casing, all coacting substantially as described for the purpose specified.

2. In a pneumatic tire, the combination of an outer casing, an inner tube, and resilient protector strips of flat rubber having overlapping beveled joint flaps and having the central portions thereof cemented to the inner wall of said outer casing, said resilient protector strips being disposed in a flexed position and tending to regain the flat position, the resiliency of said protector strips causing them to exert outward pressure against the inner face of said outer casing, all coacting substantially as described and for the purpose specified.

3. In a pneumatic tire structure, the combination of an outer casing, an inner tube, and resilient protector strips having the central portions thereof cemented to the inner wall of said outer casing, said resilient protector strips being disposed in a flexed position and tending to regain the flat position, the resiliency of said protector strips causing them to exert outward pressure against the inner face of said outer casing.

In witness whereof, I have hereunto set my hand and seal in the presence of two witnesses.

HERBERT B. GILLETTE. [L. S.]

Witnesses:
FLORENCE M. LUTON,
W. O. HUGHART, Jr.